(12) United States Patent
Firmin

(10) Patent No.: US 9,217,634 B1
(45) Date of Patent: Dec. 22, 2015

(54) SWIM LAP COUNTING AND TIMING SYSTEM AND METHODS FOR EVENT DETECTION FROM NOISY SOURCE DATA

(71) Applicant: Swimpad Corporation, Kensington, CA (US)

(72) Inventor: Robert L Firmin, Kensington, CA (US)

(73) Assignee: Swimpad Corporation, Kensington, CA (US)

( * ) Notice: Subject to any disclaimer, the term of this patent is extended or adjusted under 35 U.S.C. 154(b) by 0 days.

(21) Appl. No.: 14/705,542

(22) Filed: May 6, 2015

(51) Int. Cl.
*G01C 9/00* (2006.01)
*G01B 11/14* (2006.01)
*G06N 99/00* (2010.01)

(52) U.S. Cl.
CPC .............. *G01B 11/14* (2013.01); *G06N 99/005* (2013.01)

(58) Field of Classification Search
CPC .............................. G01B 11/14; G06N 99/005
USPC ......................................................... 702/150
See application file for complete search history.

(56) References Cited

U.S. PATENT DOCUMENTS

| | | | |
|---|---|---|---|
| 4,657,403 A | | 4/1987 | Morgan et al. |
| 4,780,085 A | * | 10/1988 | Malone .......................... 434/254 |
| 4,823,367 A | * | 4/1989 | Kreutzfeld ................... 377/24.2 |
| 5,125,010 A | | 6/1992 | Lee et al. |
| 5,136,621 A | | 8/1992 | Mitchell et al. |
| 5,138,589 A | | 8/1992 | Kimbel |
| 6,870,466 B2 | | 3/2005 | Rust et al. |
| 7,029,170 B2 | | 4/2006 | Bailey |
| 7,436,327 B2 | | 10/2008 | Kaski |
| 8,317,659 B2 | * | 11/2012 | Woodson ......................... 482/11 |
| 2013/0303248 A1 | * | 11/2013 | Williams et al. .................. 463/6 |
| 2014/0200116 A1 | * | 7/2014 | Boutov et al. .................... 482/55 |

OTHER PUBLICATIONS

Amazon.com, Inc., "FINIS Lap Track," Internet. Available at http://www.amazon.com/FINIS-1-05-027-Lap-Track/dp/B001GQ2BL8/ref=cm_cr_pr_product_top?ie=UTF8. Last visited Jul. 20, 2015.
FINIS, Inc., "Swimsense Performance Monitor: Quickstart Instructions." Internet. Available at http://www.finisinc.com/core/media/media.nl?id=593615&c=1144330&h=f77646c0b501c38a0c03, Mar. 7, 2013.
Firmin, R. and Reilly, David P., "Intervention Analysis of Semi Tool Data for Improved Process Control." Internet. Available at www.foliage.com. AEC APC XIV, Sep. 11, 2002.

(Continued)

*Primary Examiner* — Mischita Henson
*Assistant Examiner* — Stephanie Bloss
(74) *Attorney, Agent, or Firm* — PatentBest; Andrew McAleavey

(57) ABSTRACT

Systems and methods for lap timing and counting in athletic events are disclosed. The systems and methods do not require the athlete to wear a counter/timer, a transmitter, a reflector or another kind of marker. A portable computing device with a sensor, such as a tablet computer with a camera, is positioned in an appropriate location. Data from the sensor is transformed into a time series of data, and one or more learned statistics are calculated in real time as benchmark ambient conditions. The learned statistics are essentially continuously updated and data that indicates irrelevant volatility is excluded. A detection threshold is determined and essentially continuously updated based on the learned statistics, and lap completion is determined based on the threshold. Times, lap counts, and other data are displayed on the portable device in real time.

20 Claims, 7 Drawing Sheets

(56) References Cited

OTHER PUBLICATIONS

Firmin, R., "A Comprehensive Predictive Failure Analysis System," Oral Presentation, AEC/APC XV Symposium, Sep. 15, 2003.

Firmin, R., "A Comprehensive Predictive Failure Analysis System." Abstract for SEMI Technology Symposium, Innovations in Semiconductor Manufacturing, San Francisco, CA, Jul. 14-16, 2003.

Firmin, R., "A Comprehensive Predictive Failure Analysis System." Oral Presentation, 4th European AEC/APC Conference, Grenoble, France, Mar. 26-28, 2003.

Firmin, R., "Harnessing the Fourth Dimension in Process Control: The Fab as a Time Machine," Proceedings of the International Conference on Modeling and Analysis of Semiconductor Manufacturing (MASM 2002), pp. 313-318, Tempe, Arizona, Apr. 10-12, 2002.

Firmin, R., "Harnessing the Fourth Dimension: The Fab as a Time Machine," Oral Presentation, International Conference on Modeling and Analysis of Semiconductor Manufacturing (MASM 2002), Tempe, Arizona, Apr. 11, 2002.

Firmin, R., "Parallel Abstraction of Software Architecture and Statistical Principles for Tighter Process Control," SPIE APC & Automation, Mar. 2003.

Firmin, R., "Preparatory Analysis to Identify and Correct Vulnerabilities of Hotelling's T2 and of Principal Components Analysis to Assumptions Violations," IERC 2294, Mar. 27, 2003.

Firmin, R., "The Probabilistic Critical Path: Risk Simulation Models and Diverse-Distribution Statistical Control in Engineering Project Decisions," IERC 2293, Mar. 27, 2003.

Firmin, R., "The Probabilistic Critical Path: Risk Simulation Models and Diverse-Distribution Statistical Control in Engineering Project Decisions," IERC Conference, May 18, 2003.

swim outlet.com, "Lap Counters." Internet. Available at http://www.swimoutlet.com/lap-counters-c14143/. Last visited Jul. 20, 2015.

\* cited by examiner

SWIM LAP COUNTING AND TIMING SYSTEM AND METHODS FOR EVENT DETECTION FROM NOISY SOURCE DATA

BACKGROUND OF THE INVENTION

1. Field of the Invention

The invention relates to systems for counting and timing swim laps, and to methods for event detection from noisy source data.

2. Description of Related Art

Swimming as a sport dates to the ancient Greeks and has been a competitive sport in every modern Olympics. A number of high-profile national and Olympic competitors in recent years have only made it more popular. In competitive swimming events, the swimmers swim one or more lengths of a pool, each two lengths equaling one lap, turning at each end of the pool to begin the next length. For serious and competitive swimmers, counting and timing these laps is important in measuring individual progress toward goals, as well as in determining the winner of any particular race. For recreational swimmers and those who only swim for health, the distance covered is often of primary importance, with distance measured by the number of laps. Lap counting without external aids occupies a swimmer's thoughts and is tedious and unreliable, aside from which it can be very difficult to judge one's progress and observe distance and time during a swim, especially since most devices used to do so are out of the water or are attached to the body.

In officially-sanctioned competitive races, touch pads are usually provided at the ends of the pool, and as the swimmers turn to begin a new lap, they toggle the pad, which provides both verification that the lap has been properly completed and an accurate time for the lap. As accurate and accepted as these systems are, they are typically only available to competitors swimming in appropriately-equipped pools, and can cost many thousands of dollars. They are not designed for use by individuals, but rather for teams supervised by coaches. These types of devices are rarely used for individual workouts.

Timing and counting systems for individual swimmers and pools not equipped with touchpads are available. U.S. Pat. No. 5,125,010, for example, is representative of a class of devices that use a poolside unit and a wearable transmitter to time the swimmer and count laps. The poolside unit communicates with the transmitter, which is attached to the swimmer. In this patent, the two devices communicate with each other using radio frequencies, although other examples of lap counters, like the system disclosed in U.S. Pat. No. 4,823,367, attach a passive marker to the swimmer and reflect energy, like infrared beams, off of it. These types of systems continue to be made and improved; U.S. Pat. No. 6,870,466 discloses a more recent example of this type of system. A variation on this is disclosed in U.S. Patent Application Publication No. 2014/0200116, which uses a machine vision system coupled with an optical marker mounted near the swimmer's hips. All of the above-described patents are incorporated by reference in their entireties.

Systems that use a fixed unit and a portable transmitter, reflective marker, or counting unit on the swimmer have significant drawbacks. For example, the portable transmitter or marker may be uncomfortable to wear, or may cause significant drag or turbulence around the swimmer, thereby affecting biomechanics and performance. In addition, the motion of the swimmer and the environment of the water—with turbulence and thousands of disruptive bubbles—can potentially cause unreliable communications. Certain types of communications are particularly susceptible to this kind of disruption. For example, absorption of infrared light is stronger in water than in air, and laser light is particularly susceptible to disruption by bubbles.

SUMMARY OF THE INVENTION

Embodiments of the invention relate to methods and systems for detecting laps and other types of motion-based events. They can be used for swimming, for other athletic workouts and events, and in some cases, for non-athletic purposes. Using these methods and systems, an athlete is not required to wear a marker, reflector, transmitter, or transponder for lap counting and timing and can thus employ his or her usual form or biomechanics without interruption or modification.

Methods according to embodiments of the invention transform data from a sensor placed to observe the end of a lap, or another type of event, into a time series. For example, these methods may use data from a camera of a tablet computer and may transform that data into a series of data values indicating the level of incident light. The methods then calculate one or more learned statistics, such as a learned ambient mean and a standard deviation, based on the data values. This is done selectively, typically excluding data values during certain time periods that indicate more volatile non-ambient conditions and would bias the results, including only data values indicating a change that is relevant to detection, and periodically checking for a secular shift in the level of the learned statistics. The learned statistics are essentially continuously updated as time passes. A detection threshold is determined based on the learned statistics, and the methods detect the end of a lap when the data values exceed the threshold. The methods may also provide for storage of images and video of the event, allowing for a wide range of post-event evaluation and processing tasks.

These methods may be implemented on dedicated and purpose-built computing systems, but in many embodiments, they may be implemented using existing commercial portable computing devices, such as tablet computers. In that case, the onboard camera, or another onboard sensor, may be used to gather data for the methods. These systems may be networked, so that athletes who in other lanes of the pool or who are geographically separated may compete against one another and see their relative progress in real time on their own device's display. Data from the systems may be uploaded to and stored on a remote server for post-analysis and other purposes. Individual segments of a swimming workout may be planned ahead of time, and post-swim analysis may include, for example, lap times, changes in speed, speed of turns, and times by different strokes, with results sharable in social media and on other platforms.

These and other aspects, features, and advantages of the invention will be set forth in greater detail in the following description.

BRIEF DESCRIPTION OF THE DRAWING FIGURES

The invention will be described with respect to the following drawing figures, in which like numerals represent like features throughout the figures, and in which.

DETAILED DESCRIPTION

Figure 1:
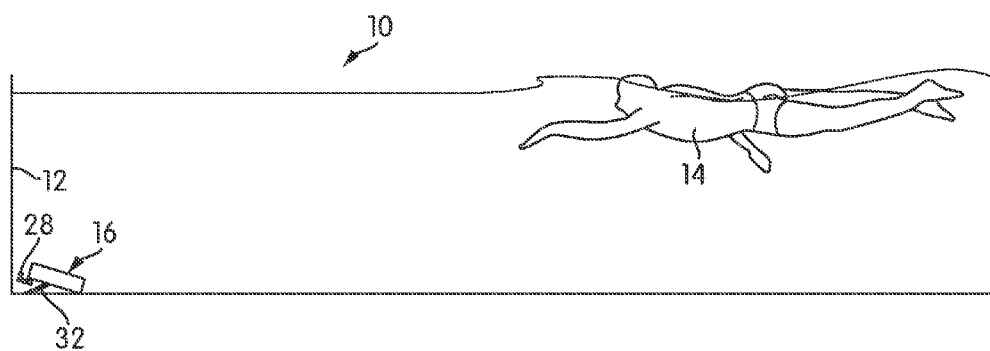
FIG. 1 is an illustration of a swim lap counting and timing system according to one embodiment of the invention.

FIG. 1 is an illustration of one embodiment of a system, generally indicated at 10, according to one embodiment of the invention. More specifically, FIG. 1 illustrates a pool 12 with a swimmer 14 in the pool. A lap detection and timing system 16 is placed in the pool 12 in a position to detect the movements or passing of the swimmer 14. The system 16 may be placed in a variety of positions in and around the pool. In the illustration of FIG. 1, the system 16 is placed near one end of the swimming pool 12. However, as will be described and shown in more detail, the system 16 may be placed in any position where the system 16 can observe when the swimmer 14 reaches or passes a defined position, which is usually the position of the system 16 itself. If necessary, the system 16 can be weighted to remain at the bottom of the swimming pool 12, or it may be hung from the side of the pool.

When using system 16, the swimmer 14 is not required to don a transmitter, transponder, marker, or other wearable element in order to make the system work. Nor is the swimmer 14 required to physically toggle a switch or touch pad with each turn. In virtually all embodiments, the swimmer 14 him- or herself is unmodified and is able to maintain his or her natural stroke. The system 16 observes the position of the swimmer 14 and, using a time-series of data, determines when the swimmer passes over the defined position. In most implementations, although not all, the defined position will be a position in which the swimmer 14 passes over the system 16 or creates a specific disturbance in the water that is perceptible by the system 16.

System 16, and other systems according to embodiments of the invention, use detection mechanisms that rely on numerical methods to process sensor data and detect when the swimmer passes over the defined position. Thus, system 16 can detect that event regardless of the noisy environment of the water. Moreover, system 16 learns the ambient characteristics of the water in each specific pool during each specific swim as the swimmer swims. As the phrase is used here, "ambient conditions" refers to the conditions of the water near the system 16 that are recorded by the system but are unaffected, or largely unaffected, by the swimmer when the swimmer is not in close proximity to the system 16.

As will be explained below in greater detail, at the core of system 16 lies a sensor coupled to a computing device to process the sensor's data. While system 16 may be assembled using custom, purpose-built electronics, it need not be. Increasingly powerful commercial, off-the-shelf computing systems are readily available to consumers, and in most embodiments, it may be more advantageous if the computing device is an off-the-shelf computing device. Of course, system 16 may include various peripherals that are particularly adapted for its purpose.

Figure 2:
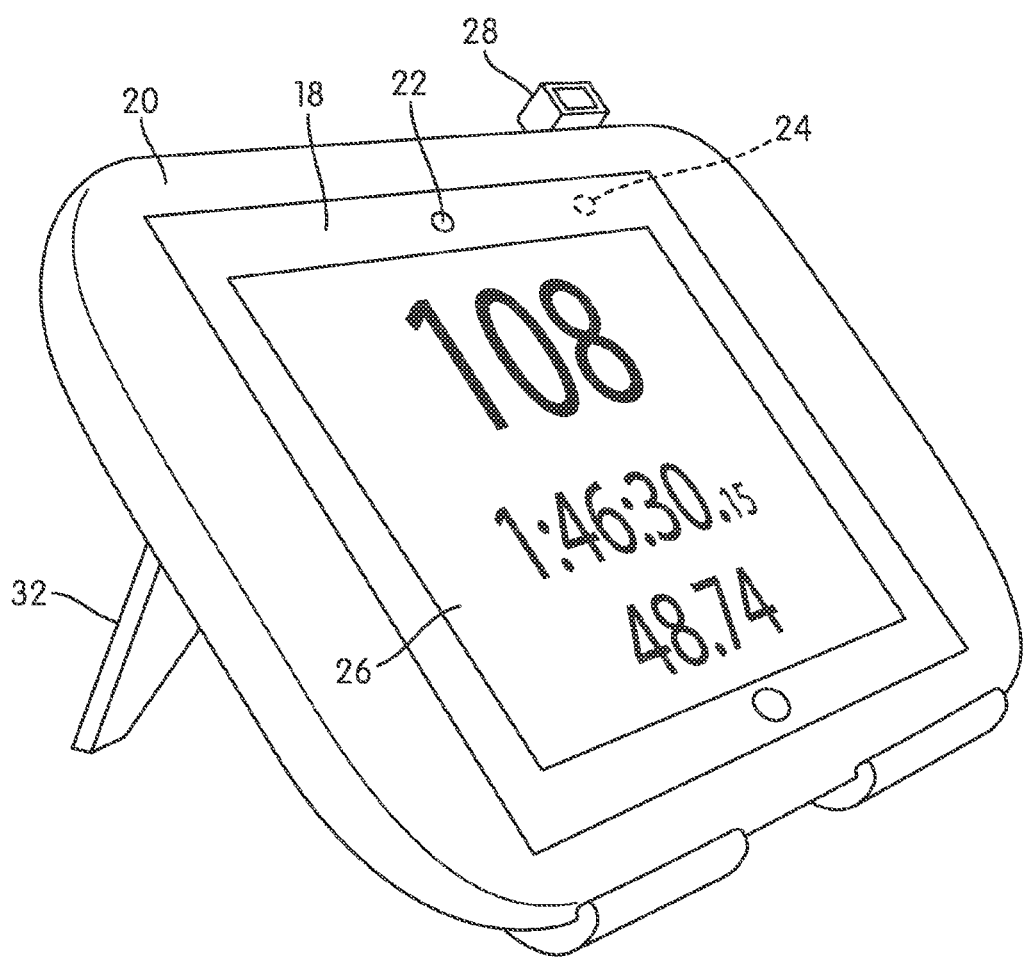
FIG. 2 is a perspective view of the system of FIG. 1.

FIG. 2 is a perspective view of a system 16 according to one embodiment of the invention. In the view of FIG. 2, the system 16 includes a computing device 18 in a waterproof casing 20. In this embodiment, the computing device 18 is a commercial computing device, such as a tablet computer. For example, tablet computers like the Apple iPAD® and the Samsung GALAXY® are suitable for use. In some embodiments, smartphones and other smaller computers, like the Apple iPHONE® and cellular phones based on the ANDROID® operating system, may be used, although it is generally preferable to use larger tablet computers because the screen may be more visible when the device is underwater and at a distance from the swimmer 14. The almost universal use of goggles, many including visual correction, makes viewing an underwater screen easy.

Commercial tablet computers have a large amount of computing power, often supplied by a microprocessor that is created or tailored for the application. Tablet computers also have a suite of onboard components and sensors, typically including a front camera 22 and a rear camera 24. Other instruments, like accelerometers and gyroscopes, may also be provided.

In most embodiments of the invention, one of the cameras 22, 24 is used as an optical sensor to determine whether the swimmer 14 has reached the defined position. The choice of camera 22, 24 depends on the characteristics of the cameras 22, 24. The cameras 22, 24 of many commercial tablet computers differ significantly in capabilities, with the front camera 22, the camera that faces the user while the device is in use, having a lower resolution (e.g., 1-2 megapixel (MP)), and the rear camera 24 having a larger resolution (e.g., 3-10 MP).

It is convenient to use the front camera 22 as the optical sensor for gathering data, so that the screen 26 of the computing device 18 and the camera 22 are both facing the swimmer 14. However, it is also helpful to use the highest resolution camera 22, 24 available as the optical sensor. Thus, depending on the resolutions of the two cameras 22, 24, it may be more advantageous to use the rear camera 24 in order to get the best data possible. For that reason, a periscope 28 may be coupled to the rear camera 24 so that the view of the rear camera 24 is redirected to the front of the computing device 18. The particular angle and field of view that the periscope 28 offers may vary from embodiment to embodiment.

The waterproof casing 20 may be rigid or it may be in the form of a flexible bag. For purposes of this description, the term "waterproof" means that the casing 20 resists water sufficiently well to allow the system 16 to operate underwater at an appropriate depth. For example, a casing 20 that is waterproof to a depth of 10-12 feet (3-4 m) may be sufficient in most embodiments. Of course, if the system 16 is designed to operate at a lesser depth, or even above the surface of the water, it may be sufficient for the casing 20 to resist only splashing and incidental contact with water. Commercially available electronics-friendly coatings may be applied to the system 16 for additional protection. Since the screen 26 of the computing device 18 is typically a touch screen, it is advantageous if the waterproof casing 20, or at least the portion of it over the touch screen 26, is equipped to convey the touch of a human finger to the screen 26. In many embodiments, this will mean that at least the portion of the casing 20 over the screen 26 is conductive. In some cases, spacers between the screen 26 and the casing 20 may be used in certain areas of the screen 26 to isolate portions of the screen 26 where buttons or controls are located so as to make touches in those areas more readily readable by the computing device 18. The system 16 of FIG. 2 also includes an angled stand 32 connected to the computing device 18 or case 20, so that the position of either or both of the screen 26 or the cameras 22, 24 is more convenient for the swimmer 14.

In use, the system 16 uses a software application to perform methods for detecting when the swimmer 14 reaches a defined point and other functions. A software application, as that term is used here, is a set of machine-readable instructions on a machine-readable storage medium that, when executed, cause the machine to perform certain functions. In the embodiment illustrated in FIG. 2, the machine in question is a tablet computer. In other embodiments, any device capable of performing the functions ascribed to it may be used. Software applications for portable computing devices like tablet computers are typically referred to as "apps."

Figure 3:
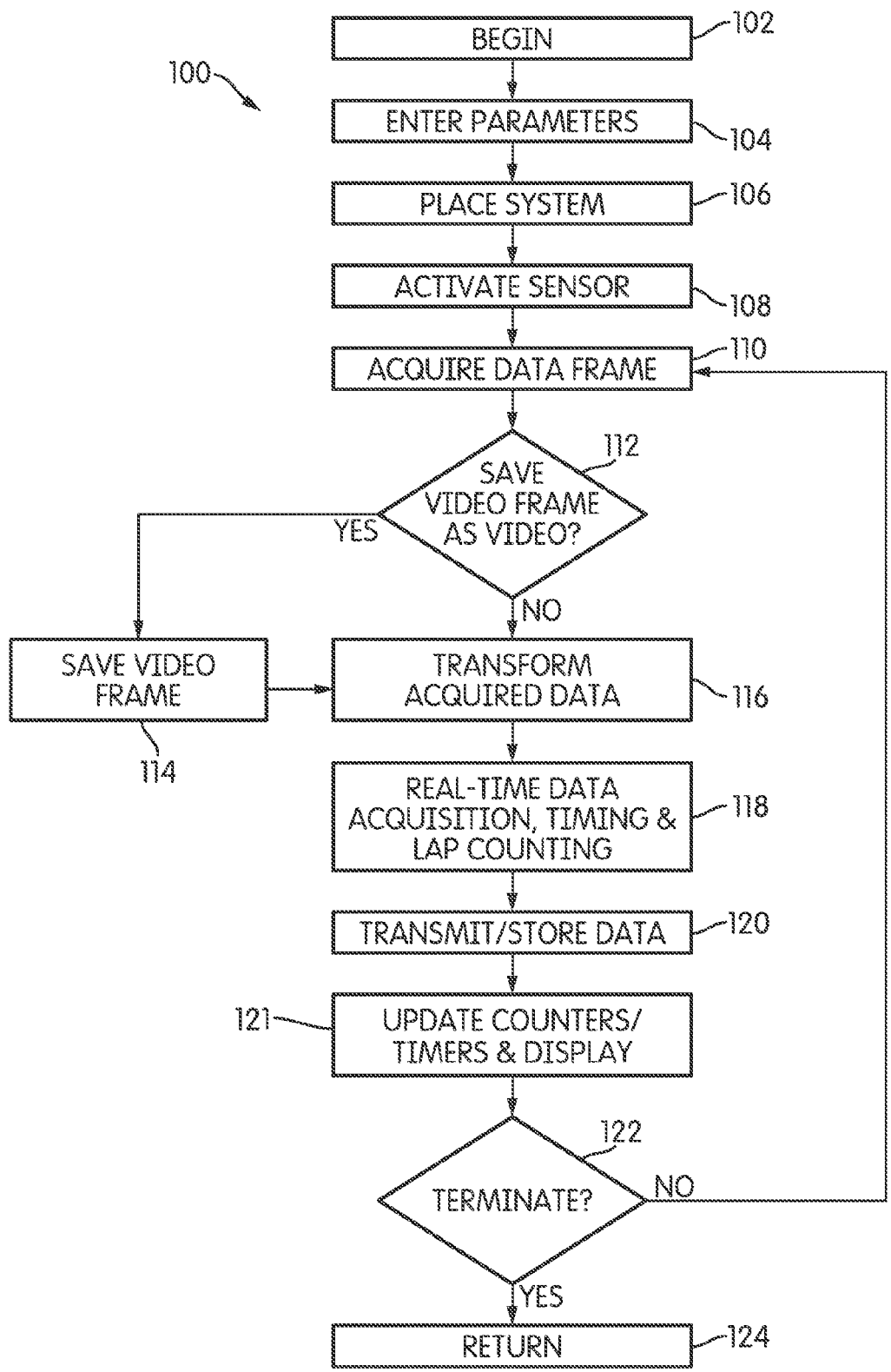
FIG. 3 is a high-level flow diagram of a method for determining when a swimmer has passed a defined position to complete a lap and for timing laps.

FIG. 3 is a flow diagram of a method, generally indicated at 100, for determining when a swimmer 14 has passed the position defined by the system 16 as indicating the end of a lap or the start of a new lap. While method 100 uses certain numerical and computational techniques, any techniques that can successfully separate signal from noise in the environment of the water may be used, and certain options will be described below in more detail. Method 100 begins at task 102 and continues with task 104.

In task 104, the swimmer 14 enters any optional parameters that are necessary for the system 16 to make accurate calculations for post-swim analysis. No additional parameters need be entered for lap counting and detection to work; thus, if the swimmer 14 desires only these functions, task 104 may be skipped. If desired for post-swim analysis, the swimmer 14 would, for example, select the length of the pool 12 and the number of laps that he or she desires to swim. The system 16 would generally include a number of standard pool lengths and configurations; the user may be given the opportunity to enter a nonstandard length. Data entry for task 104 and other tasks of method 100 may be by means of a keyboard, a simulated keyboard, or by graphical user interface (GUI) controls.

The swimmer may be permitted to enter additional parameters. Like all parameters of task 104, these additional parameters will generally be optional, necessary for additional features only, or for informational purposes. Additional parameters may include lap counting up vs. down; splits; number of multi-lap sets to swim; which stroke will be used for which lap or set of laps; a pace time against which to swim; time ahead or behind of a pace time; a drill pattern (i.e., allowing the swimmer 14 to define and specify sets of swim lengths and rest periods); display and encouragement options (text, screen color, video, and audio prompts to encourage the user); and whether or not to store video for later playback. As one example, a swimmer 14 might specify that he or she intends to swim freestyle for 30 laps, and do the breaststroke for another 6 laps with a 10-frame video of a coach or a loved one's face appearing on the screen 26 near the conclusion of the twenty-ninth lap. The swimmer 14 might further specify that video of the swim is to be stored for further analysis, and that he or she intends to swim against a pace corresponding to the performance of a famous or accomplished swimmer.

Some parameters may be set in the system 16 as defaults, but can be modified by the user in task 104. For example, the system 16 may use a green background color on the screen 26 if the swimmer 14 is at or ahead of the pace he or she has chosen, and a red background if the swimmer 14 is behind his or her chosen pace.

Although system 16 and method 100 provide accurate lap counts and times without the need for the swimmer 14 to wear anything, as will be described below in more detail, system 16 and methods like method 100 can make use of wearable peripherals to enable supplementary functions if they are available and if the swimmer 14 chooses to wear them. Some parameters may be used only if corresponding peripherals are also used. For example, the swimmer 14 may have the option to record stroke power if a load cell, strain gauge, or other such device is used, and to record strokes per lap if an accelerometer is used. The output of these peripherals may be communicated to and displayed in real time on the system 16. In most embodiments, parameters may be set in advance, and will be stored between workouts. Thus, particularly if the swimmer 14 is doing the same workout multiple times, even if parameters are used, task 104 may not be necessary in every iteration of method 100.

System 16 may also communicate with other systems 16 timing other swimmers in real time. Thus, swimmers 14 who are in the same pool 12, or swimmers 14 who are in different pools 12 that are geographically distant from one another, may compete against each other in a race or pace themselves against each other. If that is to be done, task 104 may involve allowing the swimmer 14 to set the parameters necessary to communicate with the system 16 being used by the other swimmer 14. These competitions may be in real time, or use stored split times from the other swimmers.

Figure 4:
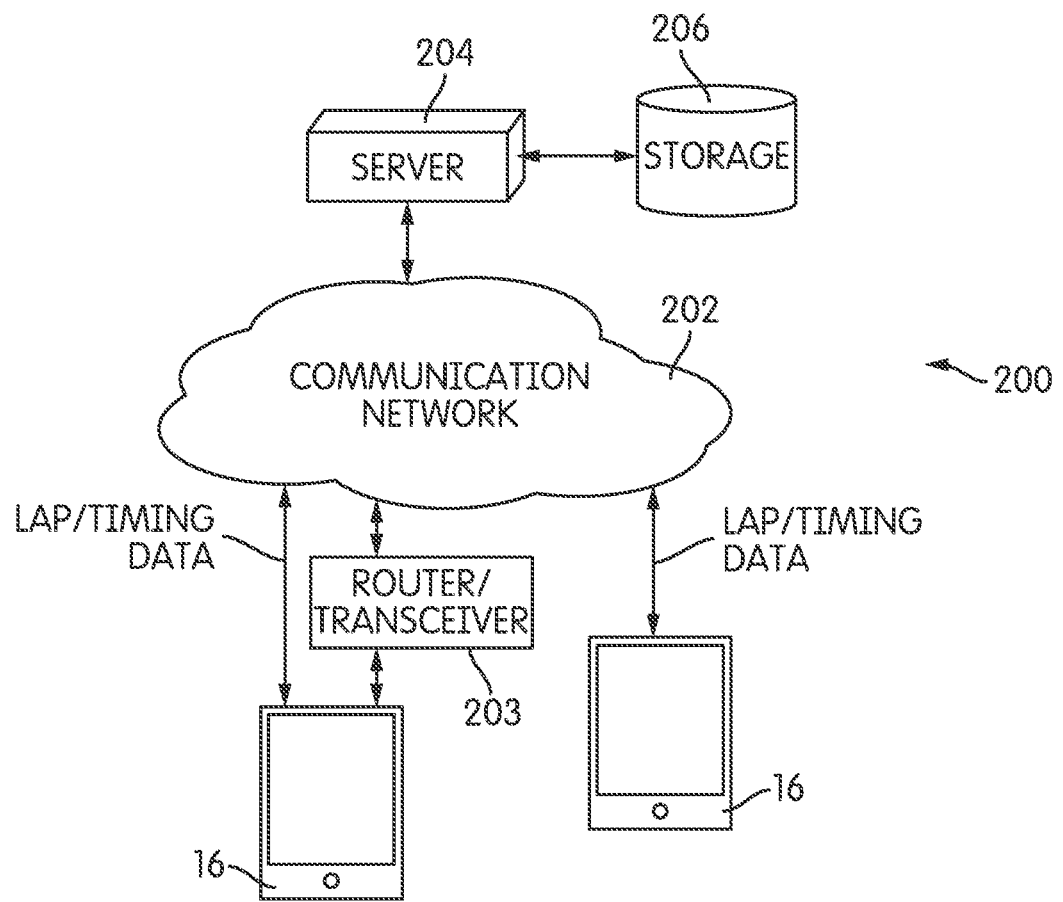
FIG. 4 is an illustration of a system for facilitating communication and competition between swimmers using the system of FIGS. 1 and 2 communicating via a network.

FIG. 4 is an illustration of a broader system, generally indicated at 200, that allows two or more swimmers 14, each using a system 16, to race against each other. As shown in FIG. 4, if the swimmers are in different pools, the multiple systems 16 communicate via a communication network 202 with a server 204. In practice, each swimmer 16 would have an account or a registered identifier with a service that operates the server 204. As lap timing data is acquired, it is transmitted from the originating system 16 to the server 204, which transmits it to the other system 16. The server 204 may also store the data in long-term storage 206. As those of skill in the art will recognize, any number of systems 16 may be placed in indirect communication this way using this kind of "cloud-based" approach, with a distant server 204 handling user authentication, recordkeeping, and transmission of real-time data from one system to another. Of course, if the swimmers 14 are local to one another, they may choose to connect their systems 16 directly using a local communication protocol like WiFi or Bluetooth, or by direct, wired connections, which may obviate the need for a server 204 in some cases.

While systems 16 may communicate directly with a communication network 202, as those of skill in the art will appreciate, they may also communicate through any number of conventional devices, including routers and transceivers 203 of various types. These devices 203 may provide a range of functions and services, including gateway services, routing, firewall functionality, signal amplification, and signal filtering. In some cases, a router, transceiver, or amplifier 203 may be placed poolside to capture signals from systems 16 that are placed underwater, since typical communication modalities may have shorter effective ranges when operating underwater.

The system 200 of FIG. 4—with one or more in-pool systems 16 connected to a server 204—may also be used in other contexts. For example, a single swimmer 14 may use the system 200 of FIG. 4 to store his or her own data without competing against other swimmers 14, and the server 204 may be used for more advanced analysis of the swimmer's performance. Swim performance data from the server 204 may also be published to other places, such as social networks.

Once parameters are entered in task 104, method 100 of FIG. 3 continues with task 106 and task 108. In task 106, the swimmer 14 places the system 16 on the bottom or side of the pool 12, and then, in task 108, activates the sensor to begin gathering data. The order of these two tasks 106, 108 is not critical, and in some embodiments, the swimmer 14 may activate the sensor before placing the system 16 in or around the pool. A remote control unit, not shown in the drawings, may also be used to activate the system 16 once it has been placed.

For the remainder of this description, it will be assumed that the sensor used by method 100 is the camera 24, 26 of the system 16. However, as those of skill in the art will appreciate, aside from light, there are other characteristics that can be measured by the system 16 to achieve the goals of method 100. For example, the system 16 might measure incident water pressure (e.g., using an onboard accelerometer), sound (e.g., using an onboard microphone), or use a ranging technology like active sonar. When using other characteristics, like pressure or sound, to determine when a swimmer 14 has completed a lap, the basic problem is the same: identify the event amidst background noise.

Method 100 continues with task 110. In task 110, the system 16 captures a frame of data from the sensor. If the system 16 is using a camera 22, 24 as the sensor, this is equivalent to capturing a single exposure. Before taking a frame of data in task 110, it may be helpful if the software executing method 100 disables features like auto-exposure control, so that each frame of data is taken with the same shutter speed, aperture, and ISO settings. Auto-focus features may also be disabled, or, in the alternative, the image may be auto-focused once, once the system 16 is in the water and on the first iteration of task 110, and not after that. Alternatively, as will be described below in more detail, some cameras 22, 24 allow lower-level data, like luminance data, to be extracted without taking a full exposure, and in those cases, the data captured in task 110 may be only that data. Method 100 continues with task 112.

The result of task 110 is typically an image, although task 110 may gather other forms of raw data from the camera 22, 24 or other sensor without capturing an image. If the result of task 110 is an image, depending on the parameters set in task 104, the swimmer 14 may choose to save the image as an image or video for later analysis of the movements of the swimmer 14. Task 112 is a decision task. If parameters have been set to save images or video for later analysis (task 112:YES), control of method 100 passes to task 114, where the image or video frame is saved, before continuing to task 116. If the swimmer 14 has decided not to save images or video for later analysis (task 112:NO), method 100 bypasses task 114 and goes directly to task 116. Data collection for light, pressure, sound, sonar, and other methodologies may be at a rate independent of the frame rate of optional video recording.

In task 116, the acquired image or non-image data from the sensor, is transformed. While methods according to embodiments of the invention may use image analysis and machine vision techniques, like edge detection and blob analysis, to determine when a swimmer 14 has passed a defined point, these methods are computationally intensive and are not necessary in most embodiments. In order to simplify the computations and perform them more efficiently, in task 116, the system transforms the image gathered in task 110 so that only a portion of the data in the original image is used. Although the term "transform" is used in this description, in some embodiments, task 116 may involve using only a subset of the data available in the image or from the sensor, in other words, simply discarding unneeded data, rather than performing some type of transforming operation on it. The term should be construed broadly to refer to both types of operations. Although this description refers to "images," the same principle holds for non-image forms of data.

One of the more effective ways of judging whether or not the swimmer 14 has passed over the point defined by the system 16 is measuring the light intensity using the camera 22, 24. For this reason, in some embodiments, a photodiode or array of photodiodes could be used instead of a camera 22, 24. If light intensity is the quantity being measured to determine whether or not the swimmer 14 has passed the defined point, then the objective of task 116, generally speaking, is to produce a single data point from the red, green, and blue (RGB) data provided by the camera 22, 24 sensor. This is done so as to maximize the observable difference between an event (i.e., the swimmer 14 passing by) and non-events (e.g., optical caustics and other lens effects created by the water and waves).

There are multiple methods by which this may be done, all of which are well known in the image and video arts. For example, task 116 may calculate a relative luminance value, which is a weighted linear sum of luminance coefficients for RGB, normalized to 1 or 100 for a reference white. Luma, the weighted sum of gamma-corrected RGB components, may also be used. Additionally, in some embodiments, a weighted sum of RGB components with custom weights for the red, green, and blue channels may be used. Unless otherwise indicated, the remainder of this description will assume that task 116 completes by producing a single luma value for each frame of data that is gathered, although method 100 could use lux or other units of measure.

Method 100 continues with task 118. Task 118 of FIG. 3 represents a variety of methods that may be used to determine when a swimmer 14 has passed over the defined point. As compared with the kinds of image-analysis methods described above, these methods work with the transformed data from the camera 22, 24 to differentiate signal from noise. In various embodiments, task 118 may use positive change (e.g., increase in incident light), negative change (e.g. decrease in incident light), or any other perceptible change to determine that an event has occurred.

As was described briefly above, while some portions of this description may assume that each data point processed in task 118 corresponds directly to an image or frame of video, that may not always be the case. Some devices 16 are capable of providing luminance data at a faster rate than that at which they capture images or video. In that case, method 100 may use the luminance data as provided by the system 16, decoupled from any particular image or frame of video. Doing this may allow the system 16 and method 100 to provide more precise lap timing by acquiring data faster.

As will be described below in greater detail, once task 118 executes to process a data point, method 100 continues with task 120, in which the data point is stored, transmitted, or both.

Along with storage of the data, method 100 also updates lap counters and timers in task 121 of method 100. A number of different types of counters and timers may be used in method 100. In the simplest embodiments, method 100 may simply count the elapsed time since the method began. However, method 100 may also implement a number of user-specifiable timers and lap counters in the course of defining a particular workout. Those timers and lap counters allow a swimmer to track an entire workout: they may specify sets of laps to be done in a particular stroke, followed by defined rest periods.

Following task 120, method 100 continues with task 122, in which it is determined whether method 100 should terminate. Method 100 may terminate when a swimmer 14 explicitly presses a control telling the system 16 to terminate method 100. Method 100 may also terminate when a preprogrammed swimming workout has been completed. In some cases, method 100 may terminate only if the user defined lap counters and timers indicate that the programmed workout, including all programmed rest periods between sets, has been completed.

If method 100 should terminate (task 122:YES), method 100 continues with task 124 and returns. If method 100 should not terminate (task 122:NO), control of method 100 returns to task 110 and another frame of data is acquired.

Method 100 of FIG. 3 and the description above provide an overview of the functions that are performed by the system 16 in separating signal from noise and determining when an event, such as a turn, has occurred. A deeper understanding of the nature of the noise inherent in various measures of an aqueous environment is helpful in understanding the precise functions performed by method 100 and other methods according to embodiments of the invention.

As those of skill in the art will appreciate, optical caustics are one of the primary sources of optical noise in a pool environment. These optical caustics are refractive effects created by wave peaks and troughs at or near the surface that concentrate and disperse light in particular patterns at the bottom of the pool. Splashes, bubbles, water flow, and other mechanical disturbances in the water also create noise.

Figure 5:
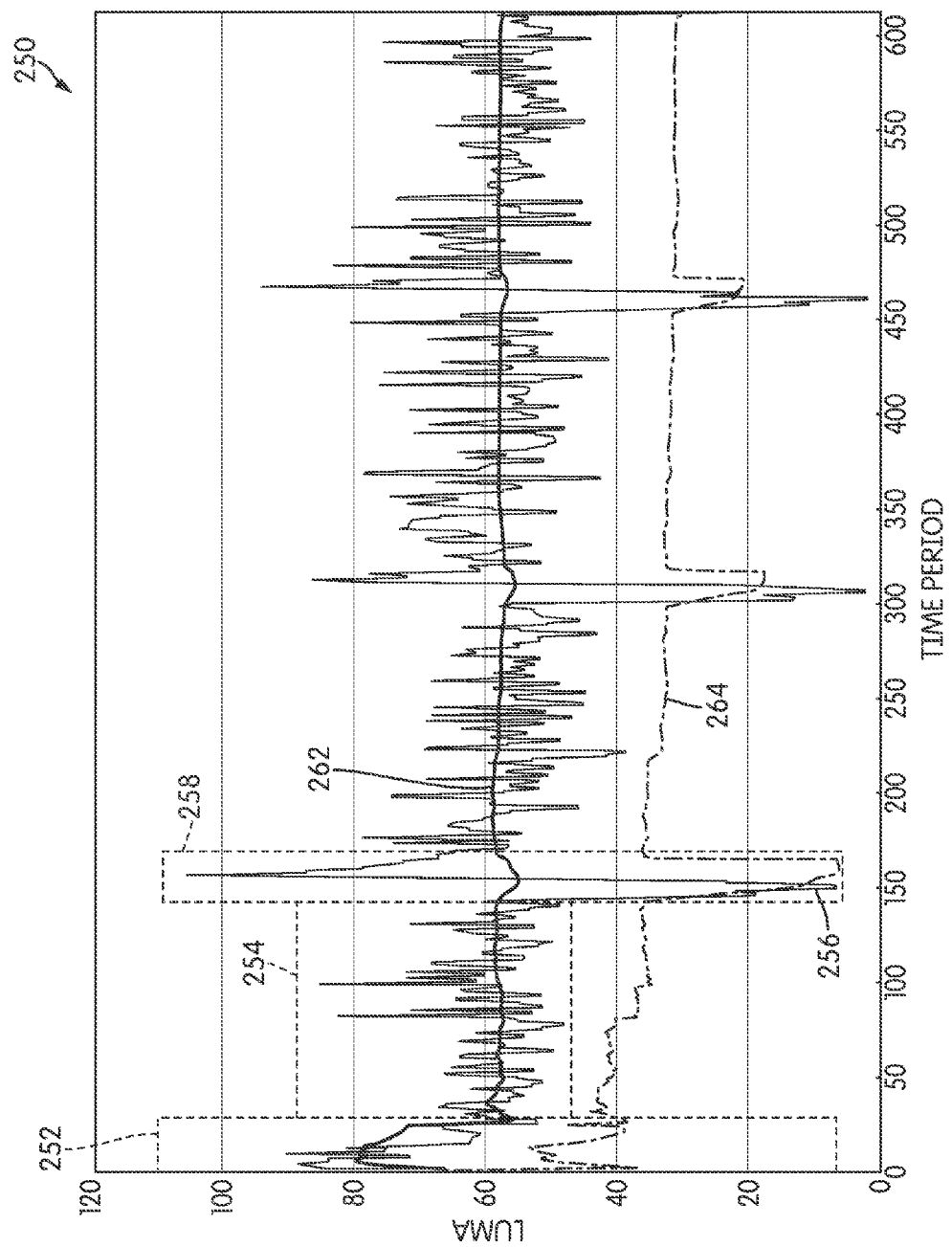
FIG. 5 is a graph of luminance data taken from a camera sensor positioned at the bottom of a pool.

The magnitude and nature of the noise, as compared with an actual event to be detected, are illustrated in FIG. 5, a graph 250 showing data derived from images acquired by a camera 22, 24 positioned at the bottom of a pool 12 as a swimmer 14 swims laps in the pool. Each data point on the graph 250 is derived from a single luminance data value obtained using the camera 22, 24. As was described above, the acquisition of these data points was decoupled from the taking of images and video. In graph 250, the data was acquired at a rate of 10 Hz.

The X-axis of the graph represents time, while the Y-axis is in units of luma. More particularly, as was described above, the image data is first transformed from RGB into a light intensity value, in this case, luma. For convenience in computation and illustration, the luma data is then further manipulated. One useful way to treat the luma data is to establish a learned ambient mean for the luma data that is continuously but selectively updated as the data is acquired.

After the system 16 is first placed in the pool 12, or after the swimmer 14 begins to swim, there is a relatively long settledown period 252 while the water settles. After the settledown period 252, there is a relatively stable period 254 until the user makes a turn 256. The turn 256 is perceptible as a drop in light intensity that, in the illustrated case, amounts to a drop to a luma detection threshold value more than 3.5 standard deviations less than the learned ambient mean luma value. The detection threshold value may be determined a priori or be learned for each workout analytically. After the turn 256, there is another settledown period. (The settledown period and the duration of the turn are enclosed by box 258 in FIG. 5.) This pattern repeats with several more turns in the graph 250. The learned ambient mean 262 is shown in the graph, as is the threshold 264 used by the system 16 to determine whether a turn has occurred. The threshold 264 in this case is the standard deviation multiplied by a threshold criterion of 3.5. Because it is based on the standard deviation, a measure of the variability of the data, the threshold 264 changes along with the data.

As shown, as time progresses, the learned ambient mean 262 becomes increasingly steadier. In the graph 250, the drop in luma value for each turn is different, but each turn shows a drop of more than 3.5 standard deviations from the learned ambient mean. Each turn is accompanied by some short-term volatility; as those of skill in the art will appreciate, a turn has some finite duration, and as long as the turn is in progress, the data will exhibit some volatility.

Figure 6:
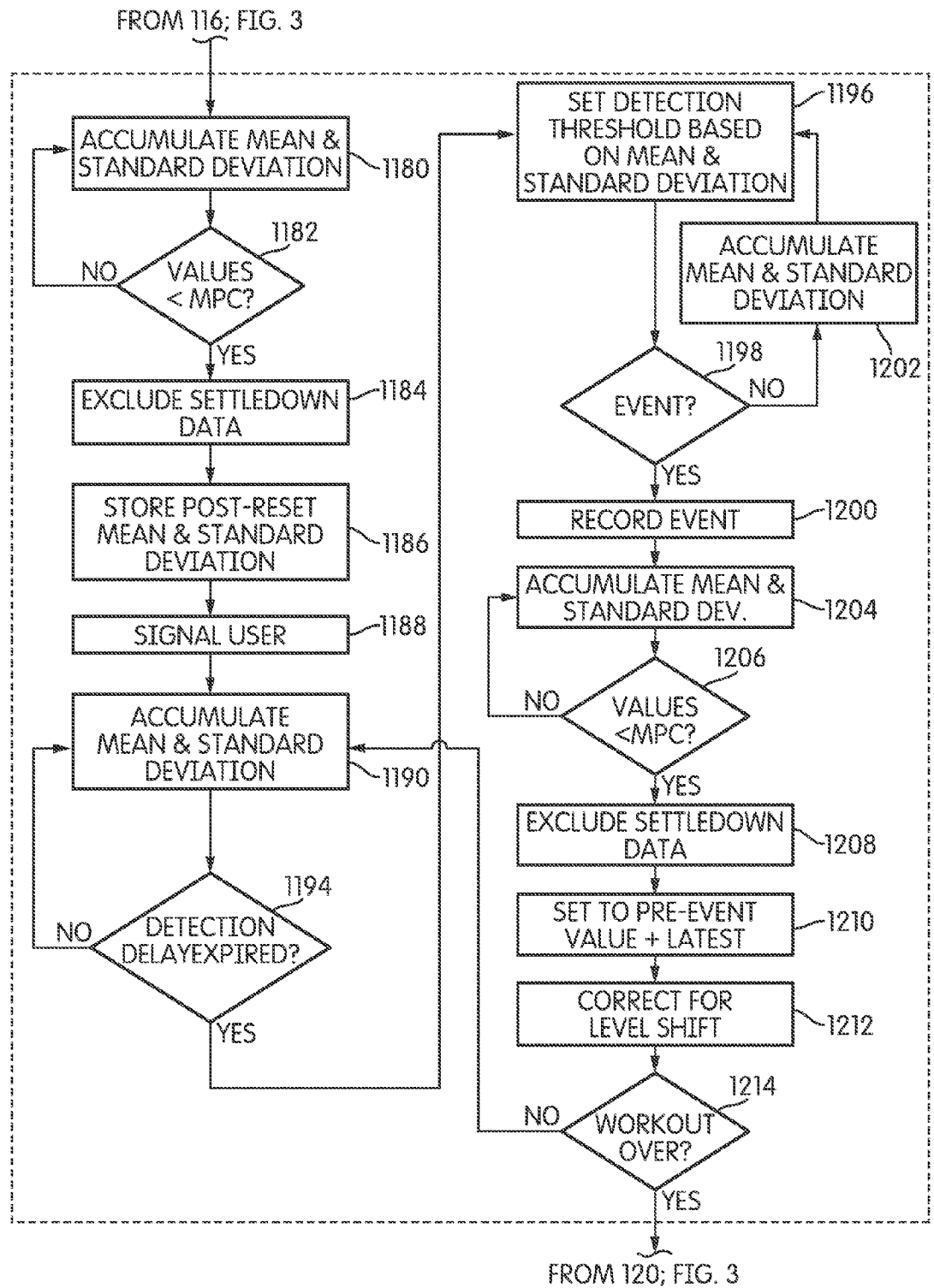
FIG. 6 is a flow diagram of the tasks involved in differentiating signal from noise and for detecting events in the method of FIG. 3.

FIG. 6 is a more detailed flow diagram illustrating one advantageous way of performing the functions of task 118 of method 100 in FIG. 3. In the version illustrated in FIG. 3, task 118 begins once a frame of data has been gathered and transformed in earlier tasks of method 100. For ease of illustration and explanation, the embodiment of task 118 shown in FIG. 6 duplicates some functions ascribed to other tasks of method 100 and presents task 118 as being more self-contained. In particular, FIG. 6 includes some data acquisition sub-tasks in task 118; in a real-world implementation, acquisition of data points may be occurring continuously while the data analysis of task 118 occurs in parallel.

As task 118 begins for the first time, the system 16 has presumably just been placed in the swimming pool 12. When the system 16 has just been placed in the swimming pool 12, the recent disturbance to the water creates additional noise and may make the data too unstable to be useable in calculations. Sub-tasks 1180-1188 detail the procedure used to perform a settledown test—i.e., determine when the water is in a settledown period and thus too unstable to be used for valid detection.

More specifically, task 118 begins in sub-task 1180 by using a point of data gathered and transformed in tasks 110-116 to calculate statistics describing the ambient conditions, so that "baseline" or "benchmark" information can later be used as a basis for comparison to detect turns and other events. In typical embodiments, the calculated statistics will be mean and standard deviation values, although any useful statistics may be calculated. These calculated mean and standard deviation values may be referred to in portions of this description as a "learned ambient mean" and a "learned ambient standard deviation" because, as will be described below, they are continuously but selectively updated using new data points as they are acquired and thus reflect the ambient conditions in the swimming pool 12. In a typical implementation, the system 16 would keep and continuously update intermediates for the calculated statistics, so that the statistics can be rapidly calculated. For example, if a learned ambient mean and a learned ambient standard deviation are the calculated statistics, a running sum of the accumulated ambient data points (e.g., luma values) and a count of the number of accumulated ambient data points would be kept readily accessible in memory for the learned ambient mean calculation. For the learned ambient standard deviation, a running sum of the squared differences would be kept in memory. Task 118 continues with sub-task 1182.

In sub-task 1182, the new learned ambient mean and standard deviation values calculated in sub-task 1180 are compared with the last learned ambient mean and standard deviation values that were calculated. If the change between the most recent learned ambient mean and standard deviation values and previously calculated learned ambient mean and standard deviation values is too large, it indicates that the data is too unstable to be used for event detection and that the water is still in a settledown period. (As those of skill in the art will appreciate, as data accumulates and the mean and standard deviation are thus based on more and more data points, it becomes more and more unlikely that a single new data point will change the value of the mean and standard deviation much unless that data point represents a relatively large change in value over previous data points, although the mean is more stable than the standard deviation.) In order to define how much change is too much, task 118 uses a maximum proportional change (MPC) value to define the maximum level of change that is permitted in the mean and standard deviation. An MPC value would typically be expressed as a percentage, and may be, e.g., 1-5%.

The actual MPCs that are used in sub-task 1182 can be determined experimentally by gathering data like that in the graph 250 of FIG. 5 and analyzing it. Typically, the MPC value would be set as a constant, and would not vary during a single execution of task 118 and method 100. In one embodiment, for example, the MPC value may be 2%; in other words, a data point can be used in calculations, and indicates that the pool 12 is no longer in a settledown period, if that new data point, when used to calculate mean and standard deviation, creates a change in mean and standard deviation of less than 2% compared with a prior calculated mean and standard deviation. The change may be positive or negative, and in many cases, absolute values may be used in the calculations and comparison of sub-task 1182, because the magnitude of the change is more important than its direction (positive or negative).

In the simplest cases, the comparison relies on only the current data point. However, more complex methods involving multiple points of data may be used in sub-task 1182. For example, a moving four-point window may be used; that is, the system may take the average of the last four data points, take the average of a set of four data points before that, determine the percentage change between those two sets of points, and compare that percentage change, or its absolute value, to an MPC threshold.

With respect to sub-task 1182, if the accumulated mean and standard deviation values are greater than the MPCs (sub-task 1182:NO), task 118 excludes the new data point from use in calculations, takes a new data point, and repeats the test of sub-task 1182, thereby extending the settledown period. As those of skill in the art will appreciate, if sub-tasks 1180 and 1182 make the initial settledown period 252 unacceptably long, the MPCs can be modified.

If the mean and standard deviation values are less than the MPCs (sub-task 1182:YES), task 118 continues with sub-task 1184, terminates the settledown period and resets. Task 118 then continues with task 1186, in which post-reset mean and standard deviation values are generated and stored. At that point, task 118 continues with sub-task 1188, and the user is signaled to begin swimming. The user may, for example, be notified to start swimming with a flashing, colored screen and a countdown. Alternatively, the swimmer may initiate countdown manually with analysis of the water starting when the countdown completes. Method 100 may ignore detection of the swimmer's starting pass over the system 16.

Sub-tasks 1180-1188 create a process whereby data points are continuously taken and recorded, but are only selectively used for lap-timing and event detection, and only after the stability and nature of the data is checked. Once the initial settledown period 252 has been detected and dispensed with, task 118 returns to accumulating data and calculating a learned ambient mean and standard deviation in sub-task 1190. This may be done in the same way as in sub-task 1180. When task 118 begins sub-task 1190, it has begun checking for events.

By the conclusion of sub-task 1190, the system 16 is accumulating data and calculating the learned ambient mean and standard deviation that describe the ambient conditions that are used as a baseline against which detection occurs. These are the first steps in detecting an event. However, it is not necessary to use the accumulated statistics for event detection immediately, because it takes some non-zero amount of time for the swimmer 14 to complete a lap. For that reason, attempting to detect the end of a lap immediately after a settledown period finishes, before anyone could reasonably finish a lap, while certainly possible, increases the risk of false positives, e.g., caused by someone crossing the swimmer's lane during the time period in which it would not have been possible for the swimmer 14 to approach the system 16 at the completion of a lap, and tends to waste computational time and power.

Thus, task 118 implements a delay before event detection takes place, as shown in sub-task 1194. In order to implement a reasonable and realistic period of delay before event detection, the system 16 may include a set value or a look-up table defining the detection delay for the particular circumstances. In many cases, that delay may be tailored to the age and gender of the swimmer 14, and to any other parameters entered in task 104 of method 100. For example, the system 16 may store data on the world's fastest times for a single lap by age, gender, and stroke. The world's fastest time for the age, gender, and stroke of the swimmer 14 could then be used to determine the extent of the detection delay in sub-task 1194. If a swimmer-specific delay is not used, the world's fastest freestyle time, irrespective of age and gender, may be used as a default.

With respect to FIG. 6, if the detection delay has not expired (sub-task 1194:NO), control of task 118 returns to task 1190 and another data point is accumulated. If the detection delay has expired (sub-task 1194:YES), task 118 continues with sub-task 1196.

By the time detection operations begin, task 118 has created a learned ambient mean and standard deviation that change with the ambient conditions. In order to detect an event, task 118 must create a threshold that is responsive to the ambient conditions, excludes variability that is irrelevant to detection, and provides reliable detection without false positives or false negatives.

For example, in one embodiment, the reliability of the detection method may be equal to or surpass 1 in 4,000: one false detection for every 4,000 events detected.

To do that, sub-task 1196 calculates and establishes a detection threshold based on the learned ambient mean and the standard deviation. The present inventor has found that when one excludes data points gathered during settledown periods, the remaining data follows a Gaussian distribution. Given that distribution and well-known statistical methods, it is a straightforward exercise to calculate a multiple of the learned ambient standard deviation beyond which it is highly probable that any detected value indicates that the swimmer 12 has passed over the system 16. The fact that the transformed data follows a Gaussian distribution also enhances the validity of calibration of the statistical techniques.

In the conditions of a lap swimming pool, for example, the threshold may be between 3 and 4 learned ambient standard deviations from the mean, for example, about 3.5 standard deviations beyond the mean. In this example, whether the threshold itself is 3.5 standard deviations beyond the mean or −3.5 deviations beyond the mean depends on whether positive change or negative change is being used for detection. The threshold may be chosen, for example, so that the probability of a false detection is 1 in 4,000 or greater.

In determining which data points to use in calculating the mean and using it to set a threshold, it can be very helpful to consider only the variability that is relevant to the detection, and to simply ignore other, irrelevant variability. As a result of optical caustics, waves, bubbles, and other factors, in a typical underwater environment during a stable period between turns, there may be spikes in luma that are up to two standard deviations greater than the learned ambient mean and up to one standard deviation less than the learned ambient mean. However, where only drops in luminance are used for detection purposes (i.e., negative change), positive variation is irrelevant to detection. Therefore, in many embodiments, it is helpful to exclude positive variation, as shown in the transformed luma data line 272. Simply put, if negative change is being used to detect events, task 118 may simply ignore positive changes. Similarly, if positive change is being used to detect events, task 118 may simply ignore negative changes. This may be done either when data points are accumulated in sub-tasks 1180 and 1190, or later in sub-task 1196.

To eliminate variability that is irrelevant to detection, the system 16 may take the difference or delta between a current data point and the previous data point. In a situation where negative change is being used to detect events, if the difference or delta is less than zero, the data point is used for calculations. If the delta or difference is greater than zero, the new data point is discarded for calculation purposes and the previous data point is simply copied into the new data point. If positive change is used for detection, negative deltas or differences would indicate that a data point should not be used for calculation. Screening out variability that is irrelevant to detection prevents the detection threshold, which is based on the mean and standard deviation, from drifting over time in response to irrelevant spikes in the data. Such drift would make detection of events more restrictive. Moreover, if a data point is not used for calculation, copying the last value, rather than inserting an arbitrary value like zero, prevents the introduction of bias in ambient conditions.

Figure 7:
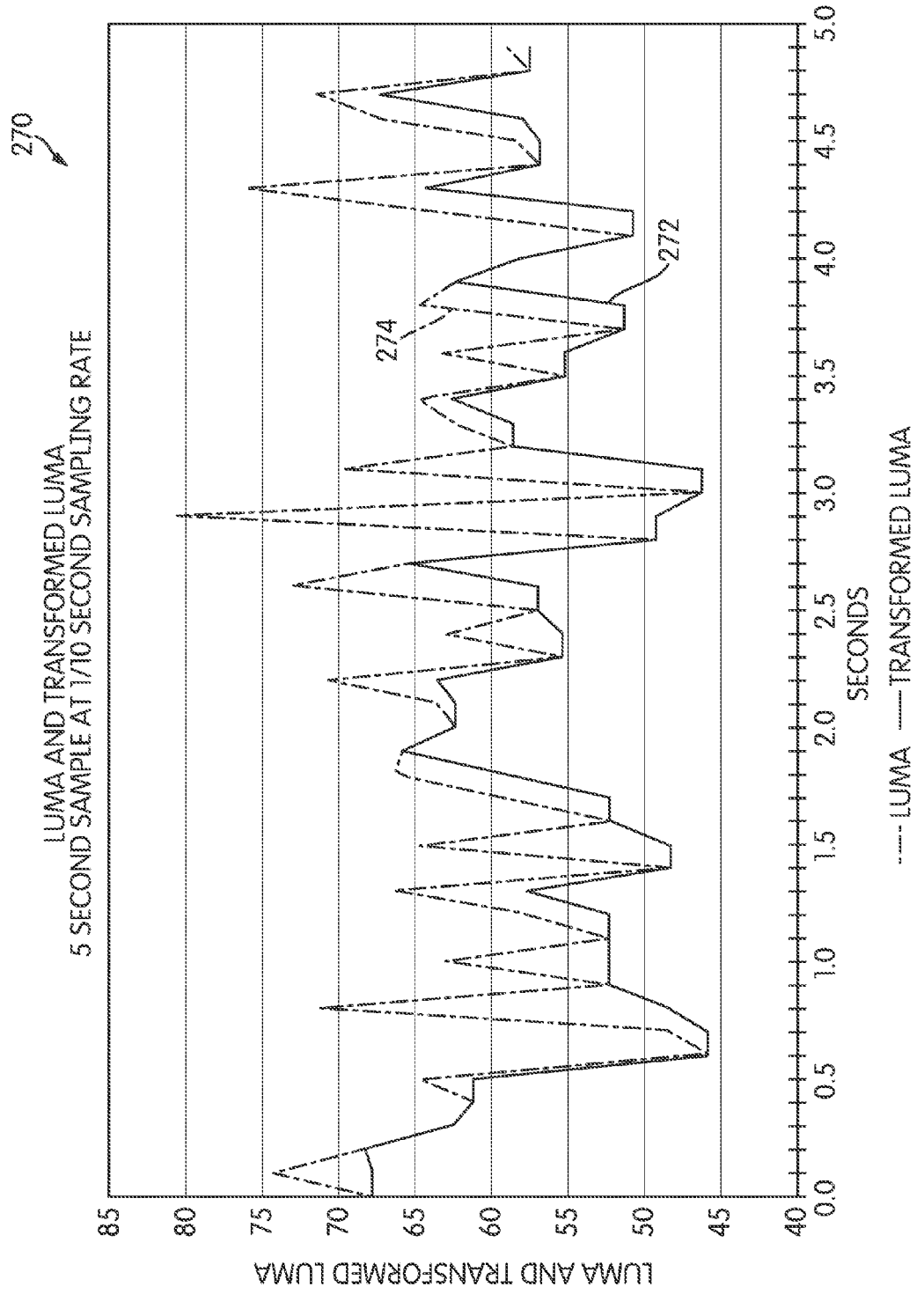
FIG. 7 is a comparison graph showing unmodified and modified luminance data.

These concepts are shown in FIG. 7, a graph 270, a five-second sample of data taken at a rate of 10 Hz. The transformed luma data 272 is identical to the data shown and used in graph 250 of FIG. 5. The original luma data 274 is also shown. Additionally, Table 1 below presents selected original and transformed data points from graph 270 for a two-second slice of time.

TABLE 1

Original and Transformed Luma Data Values from FIG. 7

| Time (s) | Luma | Transformed Luma |
| --- | --- | --- |
| 0.0 | 67.816 | 67.816 |
| 0.1 | 74.159 | 67.816 |
| 0.2 | 68.212 | 68.212 |
| 0.3 | 62.567 | 62.567 |
| 0.4 | 61.203 | 61.203 |
| 0.5 | 64.637 | 61.203 |
| 0.6 | 45.862 | 45.862 |
| 0.7 | 48.298 | 45.862 |
| 0.8 | 71.108 | 48.298 |
| 0.9 | 52.274 | 52.274 |
| 1.0 | 63.012 | 52.274 |
| 1.1 | 52.307 | 52.307 |
| 1.2 | 57.668 | 52.307 |
| 1.3 | 66.415 | 57.668 |
| 1.4 | 48.278 | 48.278 |
| 1.5 | 64.747 | 48.278 |
| 1.6 | 52.218 | 52.218 |
| 1.7 | 59.194 | 52.218 |
| 1.8 | 66.275 | 59.194 |
| 1.9 | 65.742 | 65.742 |
| 2.0 | 62.303 | 62.303 |

As can be appreciated from FIG. 7 and Table 1, whenever a luma value shows a positive change relative to the last value, it is discarded and the last value is substituted for the new value.

Once the detection threshold is set in sub-task 1196, task 118 continues with sub-task 1198, a decision task. If, after a data point is accumulated, the learned ambient mean is updated, and the threshold is calculated based on the learned ambient mean and standard deviation, a data value exceeds the threshold, that is a sign that an event has occurred. In that case (task 1198:YES), task 118 continues with sub-task 1200, where the event is recorded. If there is no event (sub-task 1198:NO), task 118 continues with sub-task 1202, another data point is accumulated, the mean and standard deviation are calculated, and task 118 then returns to sub-task 1196.

Recording the event in sub-task 1200 may involve any number of application specific tasks. Depending on the situation, the system 16 would typically increment the lap count, and may also start and stop lap timers as necessary. Other functions may be triggered when an event is detected, including giving specific visual, auditory, or video feedback to the swimmer 14. For example, the background color of the screen 26 may change depending on whether the swimmer 14 is ahead of or behind a predefined pace.

Additionally, "recording" the fact that an event has occurred in sub-task 1200 may also include timing the event itself. No event involving human beings is instantaneous; all events have some duration to them. For performance swimmers, the duration of a turn can be important and a movement on which a great deal of time and energy is spent to maximize efficiency. Thus, a record of the durations of a swimmer's turns can be very valuable. Turn duration may be measured, for example, by recording the duration of statistically significant detections.

Once an event has occurred, the water around the system 16 may be in a settledown period. Thus, with respect to the flow diagram of FIG. 6, once the event has been recorded, task 118 continues with sub-task 1204 and implements a settledown test. Similar to sub-tasks 1180 and 1202, sub-task 1204 begins accumulating data values for the mean and standard deviation. In sub-task 1206, if those values are less than defined MPC values (sub-task 1206:YES), the settledown period is over and task 118 continues with sub-task 1208. If the values are greater than the defined MPC values (sub-task 1206:NO), task 118 returns to sub-task 1204 and continues accumulating mean and standard deviation values.

In sub-task 1208, the data accumulated during the settledown period is excluded from the mean and standard deviation calculations, and in sub-task 1210, the values are re-set to the pre-event values plus the latest good data value.

Following sub-task 1210, task 118 continues with sub-task 1212. As the swimmer 14 continues with his or her workout plan, it is possible that with the passage of time, ambient conditions may change. For that reason, once an event occurs, task 118 stores the learned ambient mean and standard deviation for the previous lap or small number of laps. In sub-task 1212, task 118 determines the difference between the ambient mean and standard deviation for two consecutive periods. If that difference is above a threshold, task 118 will reset the learned ambient mean and standard deviation to that for the preceding lap or set of laps, and begin accumulating ambient condition data from there.

Once sub-task 1212 is complete, task 118 continues with sub-task 1214, a decision task. In sub-task 1214, if the programmed workout is over (sub-task 1214:YES), task 118 terminates. If the programmed workout or set is not over (sub-task 1214:NO), task 118 returns to sub-task 1190 and continues to accumulate data points and calculate the mean and standard deviation.

The frequency with which method 100 and task 118 are executed will depend on a number of factors, including the computing power of the system 16, the desired level of measurement accuracy, and the rate at which the camera 24, 26 or other sensor can gather data. If full exposures are used as the source of the data for task 118, 3-4 frames per second may be sufficient to accomplish the objectives of the method. Of course, method 100 and task 118 may be executed at whatever frequency the system 16 is capable of. If the camera 24, 26 is capable of providing luminance data separately from and faster than images, as was described briefly above, method 100 may use that capability to execute at higher frequency. The swimmer may also be given the opportunity to set the frequency, which determines the precision of timing. Many performance swimmers may desire one-tenth or even one one-hundredth of a second precision, while many casual non-performance swimmers may be happy with one second or even less precision.

As those of skill in the art will appreciate, any number of techniques may be used to process the data in place of the techniques described with respect to task 118. Essentially any technique that can be used to process a time series may be used in methods according to embodiments of the invention. Examples include Kalman filtering of the sensor output; autoregressive integrated moving average (ARIMA) modeling; and approximate entropy (ApEn) techniques, among many others.

The difficulty with many standard, unmodified data analysis techniques is that they analyze all of the data, including unstable and irrelevant periods and detections. This biases detections, a bias that increases over time. Many of these techniques require much larger data samples. Additionally, many of the standard techniques for evaluating time series of necessity must compute using the entire time series at once, instead of accumulatively, one data point at a time. Primarily for this reason, some techniques are so computationally intensive that they may not be able to operate in real time with only the computing power available on the system 16.

By contrast, the method 100 described above, and other methods according to embodiments of the invention, can operate in real time on a system 16 with limited processing power. In part, this is because the computations performed on the data for calculations of mean and standard deviation are elementary in nature; as was described above, the system 16 stores intermediate values, like a running sum of the relevant data values, the number of values in the selected data set, and the sum of the squared differences for calculations of the mean and standard deviation; the methods restrict event detection to periods of time in which it is actually possible that an event could occur; and the methods exclude variability that is irrelevant to detection of the event (e.g., positive light spikes when detection is based on a drop in incident light or negative pressure when detection is based on increase in pressure). Additionally, the use of a learned ambient mean and standard deviation, and periodically checking the level of the mean and the amount of variation (i.e., the standard deviation) for secular shifts (i.e., large and persistent shifts) as time progresses, allows methods according to embodiments of the inventions to adapt to changing ambient conditions.

If the swimmer 14 requires more detailed analysis than can be provided in real time, as was described above, that analysis is available after-the-fact using data stored either on the system 16, on another computer, or in remote storage 206 using a server 204. In addition to the data used to detect laps and turns, stored video, if any, may be stored and evaluated after the fact. In some cases, manual frame-by-frame video analysis or automatic image analysis techniques may be used to evaluate the swimmer's biomechanics.

Although traditional regression and autocorrelation-based methods, like ARIMA, may be unsuitable for real-time use in detecting turns and timing laps, those methods may be used in conjunction with the present methods, particularly in post-analysis.

In addition to analysis of the swimmer's own times and performance, embodiments of the invention can provide the swimmer 14 with competitive prompting and comparative performance evaluation. As was described above, the system 16 can store average or record performance data, like the world's fastest times broken down by age, gender, and stroke, and uses that data in the course of task 118 to perform event detection only when an event would be physically possible. Average performance data, record-setting performance data, and performance data normalized by age, gender, and other factors, can also be used in other ways in method 100.

In some embodiments, the benchmark performance data may be used to give the swimmer 14 the ability to "compete" against the swim times and other performance characteristics set by another swimmer. For example, a swimmer 14 might be given the option to swim against the times and records set by Michael Phelps, the noted Olympic swimmer, or, if the system 16 is used for running, to run against the times and records set by Sonia O'Sullivan, of 2 kilometer fame. Not all of the data stored need pertain to champions; in some cases, a user might compete against a record or goal set by the user or by another user when that other user is not available to compete in real time.

If the swimmer chooses to compete against stored records or goals, at any point in time, as the system 16 displays the lap time and total elapsed time for the swimmer 14, it may also display information on where the benchmark swimmer was or would be at that time in the swim. It should be understood that while the system 16 may in some embodiments store a large amount of data describing every phase of the swim of a particular benchmark swimmer, the system 16 may instead provide benchmarking information by extrapolating performance factors from a single data point. For example, from an overall swim interval time, the system 16 may extract individual lap times.

As described above, one advantage of the system 16 is that in typical implementations, the swimmer 14 is unmodified—he or she need not wear a reflector, a communication device, or anything else that could potentially be an inconvenience or could hinder performance. However, there are certain embodiments, and certain specific conditions, in which it may be useful to wear certain sensors or position indicators.

One case in which an accessory may be worn is if the swimmer 14 chooses to record his or her vital signs during his or her workout. In that case, he or she may wear a sensor to record those vital signs. For example, a vital sign sensor may be worn inside the swim cap at or near the temple to establish heart rate and other vital signs. That sensor may communicate with the system 16 by a wireless communication protocol in a known manner, and the system 16 would generally synchronize the incoming physiological data with the event data. Any kind of vital sign sensor may be worn, and if not worn at the temple, a sensor may be worn at the wrist or in any other place. When a vital sign sensor is used, data from the sensor may be displayed on the screen 26 of the system 16 as the swimmer 14 passes over it.

Additionally, the above description assumes that there is one swimmer 14 per lane, and thus, if a swimmer 14 passes over the system 16, it will be the swimmer 14 that the system 16 is tracking and timing. If there are multiple swimmers 14 per lap, the swimmer 14 working with the system 16 may wear a reflector or another type of device that will produce a distinct optical signature when viewed by the camera 22, 24. Multiple reflectors or light sources may each reflect or emit a different portion of the spectrum.

Of course, as those of skill in the art will realize, it may not be necessary to use reflectors or markers, even when there are multiple swimmers in the same lane. Instead, the swimmer 14 setting up the system 16 may be asked in task 104 of method 100 whether there are to be multiple swimmers 14 per lane, how many swimmers 14 there will be, and their start order. In that case, the event detection delay of task 118 of method 100 (sub-task 1182) may be relaxed, or multiple, separate delays may be instituted. System 16 and its detection methods can then assume which swimmer 14 is which because, e.g., the first event will be assumed to belong to the first swimmer 14 to start, and the second event will be assumed to belong to the second swimmer 14.

While portions of this description focus on swimming, and the methods described here have particular application to swimming, these systems and methods have broad application. First, as those of skill in the art will readily appreciate, these systems and methods may be used in any sport where lap timing and similar operations are used.

Beyond those applications, the methods described above may also have applications in other fields, and particularly in any situation that could benefit from the use of a learned ambient statistic, like a learned ambient mean, as an unbiased standard of comparison. For example, the same image-based detection techniques could be used in astronomy to find planets based on star perturbations and light dimming from planetary transits. They could also be used for automatically detecting movements, like movements of submarines and other types of military ships and vehicles, from satellite imagery. Finally, as was noted briefly above, the data analysis techniques are not limited to image or luminance data or applications involving increases or decreases in ambient light. To that end, these techniques may be used in some cyber-security applications to detect unusual activity; changes in the flow of any fluid medium (water, gas); polygraphy; physical security using changes in infrared or laser light; and medical abnormality detection. Basically, methods according to embodiments of the invention may be used in any application benefiting from detection of events that deviate from a continually updating norm, however noisy in signal, especially in real time.

Although the invention has been described with respect to certain embodiments, the description is intended to be exemplary, rather than limiting. Modifications and changes may be made, within the scope of the appended claims.

What is claimed is:

1. A detection method, comprising:
    gathering data indicating whether an unmodified moving object has passed a defined point using a sensor coupled to a computing device placed in a position to observe the defined point and to observe an event indicating that the moving object has passed the defined point, the computing device being modified or adapted for placement in the position to observe the event;
    transforming the data using the computing device from a first form into a second form in which the data can be evaluated as a time series;
    evaluating selected data points of the time series of data in real time using the computing device to establish at least one learned statistic that is updated continuously at a defined rate and that represents a set of ambient conditions around the defined point over one or more time spans of undisturbed data, the time spans being selected in real time during said gathering data and being within a time period of said gathering data;
    detecting that the event has occurred in real time using the computing device by determining that the time series of data has deviated from the learned statistic in a specified way by more than a defined threshold, the defined threshold determined, at least in part, using the learned statistic, the deviation of the learned statistic in the specified way indicating that the moving object has moved through a detection field of the sensor and has thus passed the defined point; and
    calculating and recording or displaying one or both of event count or event timing information based on said detecting.

2. The detection method of claim 1, wherein the event timing information comprises a time duration between either a beginning of the method and the event or a previous event and the event.

3. The detection method of claim 2, further comprising repeating the method to detect multiple events and incrementing the event count with each of the events.

4. The detection method of claim 1, wherein said evaluating further comprises updating the learned statistic with new data values from the time series of data only when the new data values satisfy a maximum acceptable proportional change criterion indicating that a period of non-ambient volatility has passed.

5. The detection method of claim 1, wherein said evaluating further comprises updating the learned statistic with new data values only if the new data values evince a change in the specified way.

6. The detection method of claim 1, wherein said evaluating further comprises evaluating and correcting the level of the learned statistic over time.

7. The detection method of claim 1, further comprising delaying said detecting for a non-zero interval of time such that said detecting occurs only when it is physically possible for the event to occur.

8. The detection method of claim 1, wherein:
    the sensor comprises a camera and the computing device comprises a smart phone or tablet computer;
    said transforming comprises transforming sensor data into data values derived from light intensity;
    the learned statistic comprises a learned ambient mean light intensity value;
    the specified way comprises either a positive or a negative change in the data values; and
    the defined threshold comprises a multiple of a standard deviation from the learned ambient mean light intensity value that, to within a defined level of reliability or probability, distinguishes between events and non-events.

9. The detection method of claim 1, wherein the unmodified moving object comprises a swimmer in water and the defined point comprises a lap end point.

10. A method of detecting a lap in an athletic event, comprising:
    taking data from a camera that is connected to a computing device in a position to observe a defined lap end point, the computing device being modified or adapted for use at the position;
    using the computing device, transforming the data from the camera into a time series indicative of light intensity;
    with the computing device, calculating and, at a defined rate, continuously updating, a learned ambient mean and a standard deviation in real time using data from the time series taken from undisturbed time spans to exclude from the learned ambient mean and standard deviation periods of volatility that bias detection probabilities;

defining a threshold based on the learned ambient mean and the standard deviation, the threshold indicating that the time series of data has deviated from the learned ambient mean in a specified way to an extent that indicates that an athlete has passed the defined lap end point as observed by the camera, the threshold being continuously updated at a second defined rate;

detecting that an athlete has passed the defined lap end point in real time using the computing device by determining that the threshold has been exceeded; and displaying one or more of a lap time, a total elapsed time, pacing information or a lap count to the athlete using a screen of the computing device based on said detecting.

11. The method of claim 10, wherein the periods in which ambient conditions are unsettled include one or more of pre-start periods or detected turn periods.

12. The method of claim 10, wherein said calculating further comprises updating the learned ambient mean and the standard deviation with new data values only if the new data values evince a change in the specified way.

13. The detection method of claim 12, wherein said calculating further comprises evaluating and correcting for secular shifts in the levels of the learned ambient mean and the standard deviation.

14. The detection method of claim 13, further comprising delaying said detecting for a non-zero interval of time such that said detecting occurs only when it is physically possible for the athlete to pass the defined lap end point.

15. The method of claim 12, wherein the specified way comprises either a positive change or a negative change in the incident light intensity.

16. The method of claim 10, wherein said transforming comprises transforming the data into units of luma.

17. The method of claim 10, further comprising storing one or both of images or video from the camera.

18. The method of claim 10, wherein the athlete is not required to wear a marker or reflector.

19. A method of detecting laps in swimming, comprising:

taking data from a portable computer placed on the side or bottom of a swimming pool, the portable computer including at least one sensor to generate the data based on ambient conditions in the swimming pool, the portable computer being waterproofed or encased in a waterproof enclosure;

transforming the data into a time series of data points indicative of the ambient conditions;

calculating and, continuously at a defined rate in real time, updating at least one learned statistic by (1) selectively excluding the data points from the learned statistic when those data points indicate a period of non-ambient volatility, (2) including only those of the time series of data points that indicate change in a defined direction or way relevant to the method of detecting laps, (3) periodically checking and adjusting the level of the learned statistic to accommodate longer-term shifts in the ambient conditions;

defining a threshold based on the learned statistic, the threshold indicating that the time series of data has deviated from the learned statistic in a specified way to an extent that indicates that a swimmer has completed a lap, the threshold being continuously updated at a defined rate;

detecting that a swimmer has completed a lap in real time using the portable computer by determining that the threshold has been exceeded, indicating that the swimmer has passed the detection area of the at least one sensor, said detecting being delayed for a non-zero interval of time such that said detecting occurs only when it is physically possible for the swimmer to have completed a lap; and displaying one or more of a lap time, a total elapsed time, pacing information, or a lap count to the athlete using a screen of the computing device based on said detecting.

20. The method of claim 19, wherein the sensor comprises a camera and said transforming comprises transforming the data into a time series of light intensity values.

\* \* \* \* \*